C. ROSSER.
NUT LOCK.
APPLICATION FILED MAR. 20, 1911.
1,003,804.
Patented Sept. 19, 1911.
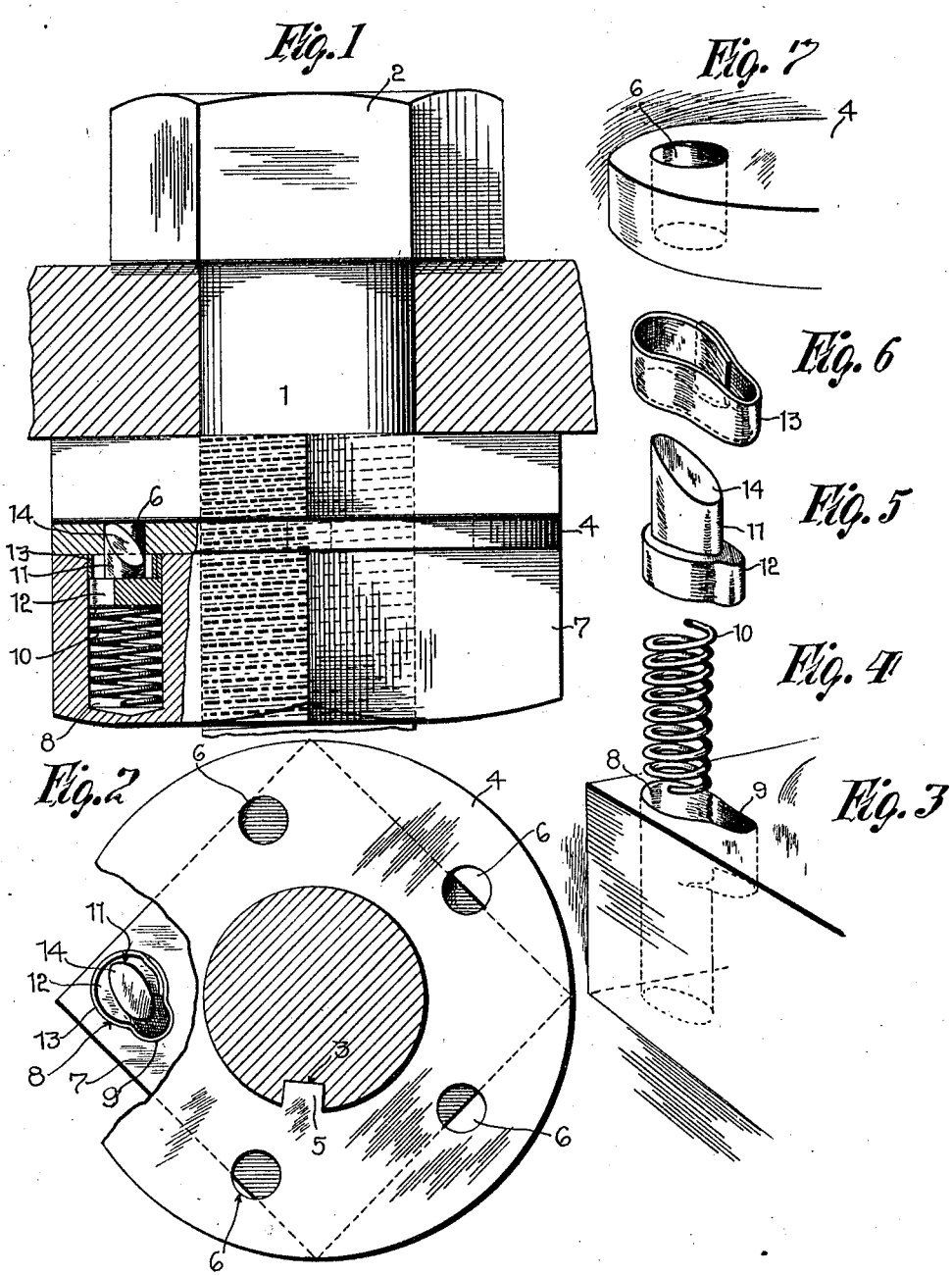
WITNESSES
Robert M. Sutphen
Ross Woodward
INVENTOR
Claud Rosser
By E. E. Vrooman
his Attorney

UNITED STATES PATENT OFFICE.

CLAUD ROSSER, OF EVANGELINE, LOUISIANA.

NUT-LOCK.

1,003,804.  Specification of Letters Patent.  Patented Sept. 19, 1911.

Application filed March 20, 1911. Serial No. 615,617.

*To all whom it may concern:*

Be it known that I, CLAUD ROSSER, a citizen of the United States, residing at Evangeline, in the parish of Acadia and State of Louisiana, have invented certain new and useful Improvements in Nut-Locks, of which the following is a specification, reference being had therein to the accompanying drawing.

This invention relates to nut locks and the principal object of the same is to provide a nut with a locking pawl which is removably secured within a socket formed in the nut and also to provide a spring collar which fits within the upper portion of the socket and surrounds the pawl and holds the pawl within the socket against the tension of the actuating spring.

This invention is illustrated in the accompanying drawings, wherein:

Figure 1 is a view of the lock nut, one portion of the nut and washer being broken away to show the manner of locking the nut to the washer. Fig. 2 is a sectional view through the locked nut and bolt, the washer being broken away. Fig. 3 is a fragmentary view of the nut showing the socket. Fig. 4 is a view of the spring which fits in the socket. Fig. 5 is a view of the locking pawl which fits within the socket upon the spring. Fig. 6 is a view of the spring collar which holds the locking pawl within the socket. Fig. 7 is a fragmentary view of the washer used in connection with this invention.

Referring to the accompanying drawings by numerals it will be seen that the invention comprises a bolt 1 which has an enlarged head 2 and a longitudinally extending slot 3 formed in the bolt. A washer 4 which is provided with a tongue 5 is placed upon the bolt with the tongue fitting in the slot 3. This washer is also provided with a number of openings 6 which are spaced around the central opening and which are engaged by a locking pawl which is carried by the nut 7. The nut 7 is threaded upon the bolt and is provided with a socket 8 which registers with one of the openings 6 when the nut is turned tightly into place. The outer end portion of the socket 8 is enlarged and formed irregular to provide a seat 9. A spring 10 is placed within the socket 8 and a lug 11 having an enlarged base 12 which fits the contour of the irregularly shaped outer end portion of the socket is placed within the socket and rests upon the spring 10 and has one portion extending into the seat 9. A spring collar 13 is compressed and inserted within the outer portion of the socket and rests upon the enlarged base 12. This collar 13 has a tendency to expand when placed within the socket and thus holds the locking lug 11 within the socket against the tension of the spring 10. When the nut is screwed tight, the locking pawl fits within one of the openings 6 of the washer and holds the nut against rotation. This locking pawl has its end face 14 beveled so that the pawl can easily ride out of the openings when turning the nut into place, but which will hold the nut tightly in place when it is screwed up tight. By having the locking pawl provided with the irregular base 12 it is prevented from turning in the socket which would permit the nut to work loose if it turned in the opposite direction from that shown in Fig. 1. When it is desired to remove the nut a spring wrench is placed upon the nut and it is turned so that the pawl is bent and the nut can then be unscrewed. After the nut has been unscrewed, the collar 13 can be very easily removed from the socket and a new locking pawl inserted so that the nut can be used again.

What I claim is:—

A nut lock comprising a bolt, a locking washer mounted upon said bolt and provided with means for preventing rotation upon said bolt, said washer being also provided with a plurality of sockets, a nut threaded upon said bolt, said nut being provided with a socket having an irregularly shaped outer portion, a spring fitting within said socket, a locking pawl mounted in the irregular outer portion of said socket and contacting with said spring and a spring collar fitting within the irregular outer portion of said socket to hold said pawl in place, said pawl adapted to engage one of said sockets to lock said nut.

In testimony whereof I hereunto affix my signature in presence of two witnesses.

CLAUD ROSSER.

Witnesses:
 ED. BYTHES,
 JIM STAKEMILLER.

Copies of this patent may be obtained for five cents each, by addressing the "Commissioner of Patents, Washington, D. C."